United States Patent
Okamura et al.

(10) Patent No.: US 7,425,385 B2
(45) Date of Patent: Sep. 16, 2008

(54) NON-AQUEOUS ELECTROLYTE SECONDARY BATTERY

(75) Inventors: Kazuhiro Okamura, Osaka (JP); Keiko Nagata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 23 days.

(21) Appl. No.: 11/331,447

(22) Filed: Jan. 13, 2006

(65) Prior Publication Data

US 2006/0172180 A1 Aug. 3, 2006

(30) Foreign Application Priority Data

Jan. 14, 2005 (JP) .............................. 2005-007398

(51) Int. Cl.
*H01M 4/02* (2006.01)
*H01M 4/66* (2006.01)
*H01M 2/00* (2006.01)
*H01M 4/00* (2006.01)
*H01M 6/10* (2006.01)

(52) U.S. Cl. ......................... 429/61; 429/94; 429/245; 429/62; 429/243

(58) Field of Classification Search .................. 429/61, 429/94, 245, 62, 243
See application file for complete search history.

(56) References Cited

U.S. PATENT DOCUMENTS 7,217,477 B2 * 5/2007 Park et al. ................... 429/306
2006/0110660 A1 * 5/2006 Satou et al. ............ 429/231.95

FOREIGN PATENT DOCUMENTS

| JP | 02-199769 | 8/1990 |
| JP | 07-296852 | * 11/1995 |
| JP | 10-321258 | 12/1998 |
| JP | 3353455 | 12/2002 |

* cited by examiner

*Primary Examiner*—Patrick Ryan
*Assistant Examiner*—Angela Martin
(74) *Attorney, Agent, or Firm*—McDermott Will & Emery LLP

(57) ABSTRACT

A non-aqueous electrolyte secondary battery including: an electrode group in which a positive electrode plate and a negative electrode plate are spirally wound with a separator interposed therebetween; and a non-aqueous electrolyte, wherein the positive electrode plate has at least one exposed portion of the positive electrode current collector, the negative electrode plate has at least one exposed portion of the negative electrode current collector, and a metal that dissolves into the non-aqueous electrolyte when the battery voltage exceeds a predetermined level is provided on a surface of the exposed portion of positive electrode current collector facing the exposed portion of negative electrode current collector. This battery is extremely safe because it prevents overcharge and internal short-circuit at an area where the positive and negative electrode active materials and the non-aqueous electrolyte exist together.

3 Claims, 2 Drawing Sheets

NON-AQUEOUS ELECTROLYTE SECONDARY BATTERY

FIELD OF THE INVENTION

The present invention relates to a non-aqueous electrolyte secondary battery, and more particularly to a non-aqueous electrolyte secondary battery in which a metal that dissolves when the battery voltage exceeds a predetermined level is provided on a positive electrode.

BACKGROUND OF THE INVENTION

Non-aqueous electrolyte secondary batteries including lithium ion secondary batteries having a high energy density are widely used as power sources for portable appliances such as personal computers, cell phones, digital cameras and camcorders. From environmental and resource protection perspectives, electric vehicles are expected to emerge in the near future. Non-aqueous electrolyte secondary batteries having a high energy density are attracting attention as a possible power source for electric vehicles, and the development thereof is proceeding.

Currently available non-aqueous electrolyte secondary batteries contain a non-aqueous electrolyte comprising a flammable non-aqueous solvent, a metal oxide (e.g., lithium cobalt oxide) as a positive electrode active material, and a carbon material (e.g., graphite) as a negative electrode active material. Accordingly, if a non-aqueous electrolyte secondary battery is heated by some factor and reaches an overheated state, the positive electrode active material decomposes and produces oxygen. If the produced oxygen oxidizes the negative electrode active material or the non-aqueous solvent, the battery might rupture or go into thermal runaway. The overheated state of non-aqueous electrolyte secondary batteries can be classified into two types: (i) an entirely heated state in which the entire battery is heated by overcharge; and (ii) a locally heated state in which the battery is locally heated by internal short-circuit. The risk of danger increases if these two states occur concurrently. In order to improve battery safety, it is necessary to prevent overcharge, as well as internal short-circuit at the area where the positive electrode active material, the negative electrode active material and the non-aqueous electrolyte exist together.

Conventionally, in order to prevent overcharge of secondary batteries, a technique is used in which a conductive material that exerts its conductivity by doping of ions is disposed between a positive electrode and a negative electrode, whereby when the battery reaches an overcharged state, the positive electrode and the negative electrode are shorted to prevent further overcharging (see, e.g., Japanese Laid-Open Patent Publications Nos. Hei 2-199769 and Hei 10-321258, hereinafter referred to as Patent Documents 1 and 2, respectively). Another conventional technique is to add an austenitic stainless steel powder to a positive electrode to allow positive and negative electrodes to be shorted, thereby preventing further overcharging (see, e.g., Japanese Patent Publication No. 3353455, hereinafter referred to as Patent Document 3).

Patent Document 1 discloses to dispose, between and in contact with positive and negative electrodes, a separator containing a polymer that exerts conductivity by doping of ions so as to cause an internal short-circuit between the positive and negative electrodes in the event of an overcharge, thereby preventing further overcharging. Patent Document 2 discloses to add, to an electrolyte, a monomer for producing a conductive polymer by polymerization at an overcharge voltage so as to allow the produced conductive polymer to cause an internal short-circuit between positive and negative electrodes, thereby preventing further overcharging. Patent Document 3 discloses to add, to a positive electrode, an austenitic stainless steel powder that dissolves at an overcharge voltage so as to allow the dissolved metal to deposit on a negative electrode to cause an internal short-circuit between the positive and negative electrodes, thereby preventing further overcharging.

According to the above-mentioned techniques, a short-circuit is caused at an area between the positive and negative electrodes where the positive and negative electrode active materials and the non-aqueous solvent exist together. However, a case can happen in which a battery reaches an overcharged state without reaching the decomposition temperature of a positive electrode active material. If the positive and negative electrodes are shorted at an area where the positive electrode active material exists while the battery is in the above condition, the short-circuit current produces Joule heat at the shorted area to further increase the local temperature to the level at which the positive electrode active material decomposes and produces oxygen. This raises internal pressure of the battery, which increases the risk of a battery rupture. Moreover, if the local temperature exceeds the ignition temperature of the non-aqueous solvent or the oxidation reaction temperature of the negative electrode active material, oxygen produced from the positive electrode active material burns them, which increases the risk of thermal runaway of the battery.

In view of the above, an object of the present invention is to provide a non-aqueous electrolyte secondary battery which is extremely excellent in safety by preventing overcharge as well as internal short-circuit at an area where a positive electrode active material, a negative electrode active material and a non-aqueous solvent exist together.

BRIEF SUMMARY OF THE INVENTION

The present invention relates to non-aqueous electrolyte secondary battery comprising: an electrode group in which a positive electrode plate and a negative electrode plate are spirally wound with a separator interposed therebetween; and a non-aqueous electrolyte, the positive electrode plate comprising a positive electrode current collector and a positive electrode material mixture layer carried on the positive electrode current collector, the negative electrode plate comprising a negative electrode current collector and a negative electrode material mixture layer carried on the negative electrode current collector. The positive electrode plate has at least one exposed portion of the positive electrode current collector. The negative electrode plate has at least one exposed portion of the negative electrode current collector. And a metal that dissolves into the non-aqueous electrolyte when the battery voltage exceeds a predetermined level is provided on a surface of the exposed portion of positive electrode current collector facing the exposed portion of negative electrode current collector.

More specifically, in the non-aqueous electrolyte secondary battery of the present invention, in each of the positive and negative electrodes, an exposed portion of current collector carrying no active material is formed. In other words, at least one portion of each of the positive and negative electrode current collectors is covered with no active material and thus is exposed. And a metal that dissolves when the battery in an overcharged state exceeds a predetermined voltage level, i.e., maximum charge voltage in normal operation, is disposed on the surface of the exposed portion of the positive electrode current collector such that the metal is electrically connected to the exposed portion. When the battery is overcharged, the metal on the exposed portion of the positive electrode current collector dissolves into the non-aqueous electrolyte, which then deposits on the negative electrode current collector, causing a short circuit between the positive and negative electrode plates. This prevents the overcharge from proceeding further. Because the short-circuit occurs at an area where neither the positive or negative electrode active material exists, the generation of oxygen from the positive electrode active material can be prevented. Accordingly, the internal pressure of the battery does not rise so that it is possible to protect the battery from rupturing and to protect the negative electrode active material and the electrolyte from burning.

The metal disposed on the exposed portion of the positive electrode current collector comprises a metal that dissolves when the battery voltage exceeds 4.2 V. The metal preferably comprises at least one alloy selected from the group consisting of iron alloy, copper alloy and cobalt alloy. The at least one alloy preferably contains chromium in an amount of 0.1 to 30 wt %. The chromium contained in the iron-chromium alloy, copper-chromium alloy or cobalt-chromium alloy forms a passivation film on the alloy surface which prevents the metal from corroding. Iron, copper and cobalt dissolve easily at a potential of 3.4 V to 3.6 V (relative to a lithium electrode) whereas chromium hardly dissolves until a potential of 6.0 V (relative to a lithium electrode). The dissolving potential and dissolving reaction speed of the iron-chromium alloy, copper-chromium alloy and cobalt-chromium alloy vary according to the amount of chromium contained in the alloy.

If the metal comprises a metal that dissolves at a battery voltage of not greater than 4.2 V (i.e., the voltage at which non-aqueous electrolyte secondary batteries normally operate), a short-circuit is caused even during normal operation, and the battery capacity is reduced. Positive electrode active materials tend to be unstable as an overcharge proceeds at a voltage exceeding 4.2 V, and thus are more likely to be decomposed. As such, the metal preferably dissolves at an overcharge voltage exceeding 4.2 V but as close to 4.2 V as possible, and deposits on the negative electrode to effect short-circuit discharge. The overcharge current that flows during such short-circuit condition is split into two parts: one is used for the charge reaction of the battery; and the other is used for the dissolving reaction of the metal. In order to prevent overcharge from proceeding, the dissolving reaction speed of the metal should be higher. Ordinarily, austenitic stainless steel has a low dissolving reaction speed, and therefore is not suitable in the event of an overcharge at high current. Moreover, in order to effect high rate discharge during short-circuit, the metal deposited on the negative electrode preferably has a low electrical resistance. Hence, iron alloy, copper alloy and cobalt alloy which contain chromium in an amount of 0.1 to 30 wt % are suitable materials that satisfy some of the above requirements.

According to the present invention, because battery overcharge as well as internal short-circuit at an area where a positive electrode active material, a negative electrode active material and a non-aqueous electrolyte exist together can be prevented, it is possible to provide a non-aqueous electrolyte secondary battery extremely excellent in safety.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As described above, the present invention is directed to a non-aqueous electrolyte secondary battery including: a spirally-wound electrode group in which a positive electrode plate and a negative electrode plate are spirally wound with a separator interposed therebetween; and a non-aqueous electrolyte. The positive electrode plate includes a positive electrode current collector and a positive electrode material mixture layer carried on the positive electrode current collector. The negative electrode plate includes a negative electrode current collector and a negative electrode material mixture layer carried on the negative electrode current collector. In the spirally-wound electrode group, the positive electrode plate has at least one exposed portion of the positive electrode current collector, and the negative electrode plate has at least one exposed portion of the negative electrode current collector. On the surface of the exposed portion of the positive electrode current collector facing the exposed portion of the negative electrode current collector is provided a metal that dissolves into the non-aqueous electrolyte when the battery voltage exceeds a predetermined level.

The present inventors vigorously investigated a metal that dissolves at a particular potential which will be discussed more fully below, and they found that in order to provide a non-aqueous electrolyte secondary battery having excellent safety, iron alloy, copper alloy and cobalt alloy which contain chromium in an amount of 0.1 to 30 wt % are particularly preferred as the metal that dissolves when the battery voltage exceeds 4.2 V.

An embodiment of the non-aqueous electrolyte secondary battery of the present invention will be described below in detail for a case where the non-aqueous electrolyte secondary battery of the present invention is a lithium ion secondary battery.

Figure 1:
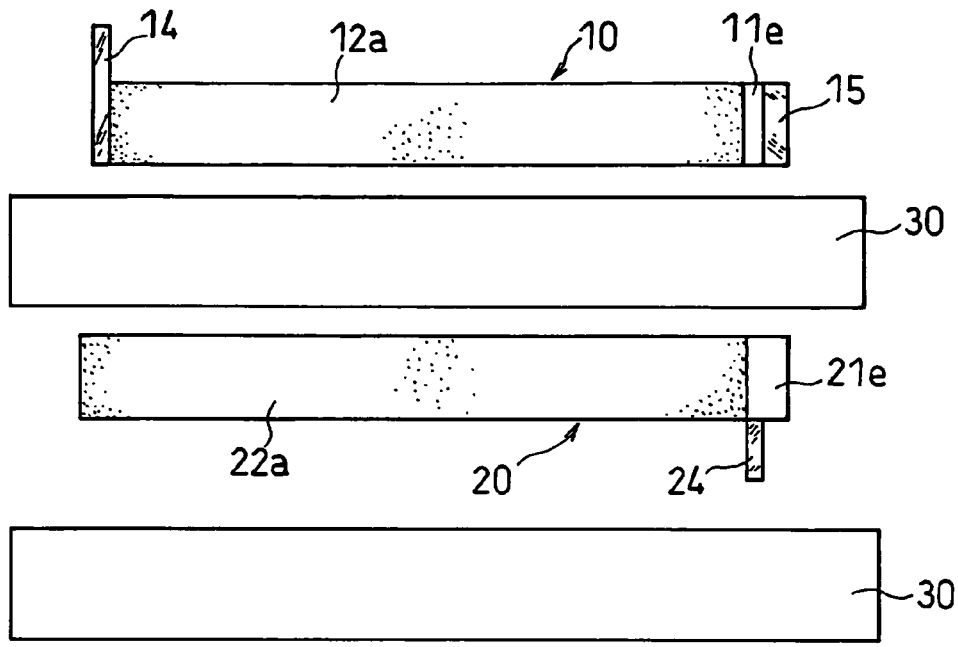
FIG. 1 is a front view of a positive electrode, a negative electrode and a separator constituting an electrode group of a lithium ion secondary battery according to one embodiment of the present invention.
Figure 2:
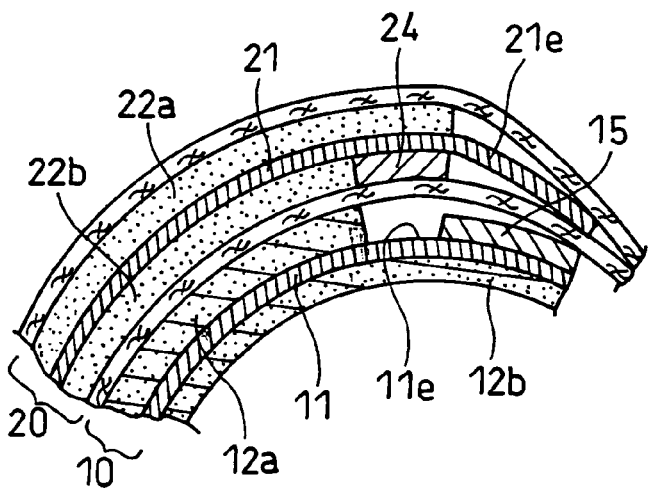
FIG. 2 is a transverse sectional view of a spirally-wound electrode group of a lithium ion secondary battery according to one embodiment of the present invention illustrating the winding end thereof.

FIG. 1 is a front view of a positive electrode, a negative electrode and a separator constituting an electrode group of a lithium ion secondary battery according to one embodiment of the present invention. FIG. 2 is a transverse sectional view of the spirally-wound electrode group illustrating the winding end thereof. It should be understood that these drawings are provided to facilitate the understanding of the present invention, and the relative size and positional relation of the components are not necessarily accurate.

A positive electrode 10 comprises a positive electrode current collector 11 made of a metal foil (e.g., aluminum foil) and positive electrode material mixture layers 12a and 12b carried on both surfaces of the current collector 11. In the positive electrode 10, an exposed portion of the positive electrode current collector is formed on the surface of the positive electrode current collector 11, which will serve as the outer surface when spirally wound, at the side which serves as the start of winding (hereinafter referred to as winding start side). A positive electrode lead 14 is connected to the exposed portion by welding. On the same surface of the positive electrode current collector 11 (i.e., the surface which will serve as the outer surface when spirally wound) at the other side which serves as the end of winding (hereinafter referred to as winding end side) is formed another exposed portion 11e of the positive electrode current collector. A metal layer 15 that dissolves when the battery voltage exceeds a predetermined level is fixed on the exposed portion 11e with a space interposed between the end of the positive electrode material mixture layer 12a and the metal layer 15 by means of, for example, welding. Another surface of the positive electrode current collector 11, which will serve as the inner surface when spirally wound, is covered with the positive electrode material mixture layer 12b.

A negative electrode 20 comprises a negative electrode current collector 21 made of a metal foil (e.g., copper foil) and negative electrode material mixture layers 22a and 22b carried on both surfaces of the current collector 21. In the negative electrode 20, both surfaces of the negative electrode current collector 21 at the winding start side are covered with the negative electrode material mixture layers 22a and 22b, respectively, while both surfaces of the negative electrode current collector 21 at the winding end side are exposed. In other words, an exposed portion 21e not covered with the negative electrode material mixture layers 22a and 22b is formed. In this embodiment shown in FIGS. 1 and 2, a negative electrode lead 24 is connected to the exposed portion 21e on the surface of the negative electrode current collector 21 which will serve as the inner surface when spirally wound by way of welding such that the negative electrode lead 24 is in contact with the end of the negative electrode material mixture layer 22b.

The metal layer 15 is attached to the exposed portion 11e of the positive electrode current collector 11 in such a position that the metal layer 15 is not in contact with the positive electrode material mixture layer 12a. In the electrode group, the metal layer 15 faces the exposed portion 21e of the current collector 21 which is covered with no negative electrode material mixture layer.

When a lithium secondary battery having the structure described above is charged and the battery voltage exceeds a predetermined level, namely 4.2 V, for example, the metal layer 15 dissolves into the non-aqueous electrolyte due to anodic oxidation. The dissolved metal ions migrate to the exposed portion 21e of the negative electrode current collector of the negative electrode 20 which is positioned opposite to the metal layer 15, where the metal ions are reduced and deposit in the form of a metal. The deposited metal causes a short-circuit between the positive and negative electrodes. Thereby, the overcharge is prevented from proceeding further.

A description is now given of the metal that dissolves when the battery voltage exceeds 4.2 V.

Metals exhibit their own characteristic dissolving behaviors when a positive potential is applied thereto in a non-aqueous electrolyte. The present inventors repeatedly conducted various examinations and experiments, and they found metals suitable for the present invention. More specifically, zinc dissolves significantly when a potential of not less than 2.6 V relative to a lithium electrode (Li/Li$^+$) is applied. Likewise, tin significantly dissolves at not less than 2.6 V, iron at not less than 3.4 V, copper, silver and cobalt at not less than 3.6 V. Niobium dissolves slowly when a potential of not less than 3.2 V relative to a lithium electrode (Li/Li$^+$) is applied. Likewise, tantalum slowly dissolves at not less than 3.2 V, molybdenum at not less than 3.9 V, tungsten and vanadium at not less than 4.2 V, palladium at not less than 5.1 V.

On the other hand, metals such as aluminum, titanium, nickel, chromium, zirconium, platinum, gold and hafnium hardly dissolve or do not dissolve at all until a potential of 6.0 V is applied. Alloys composed of these metals exhibit dissolving behavior characteristic of the components according to the composition, the crystal structure and the metallographic condition thereof.

An alloy composed of metals that dissolve significantly such as copper-zinc alloy and copper-tin alloy dissolves significantly at not less than 2.6 V to not less than 3.6 V. An alloy composed of a metal that significantly dissolves and a metal that hardly dissolves or does not dissolve at all in an almost equal amount such as copper-nickel alloy and iron-nickel alloy hardly dissolves or does not dissolve at all. However, an alloy composed of only metals that hardly dissolve or do not dissolve at all such as a nickel-titanium alloy dissolves significantly at not less than 3.3 V. As can be seen from the above, the dissolving behavior of an alloy cannot be deduced simply from the dissolving behavior of each single metal contained in the alloy.

In the present invention, a metal piece or metal layer provided on the surface of the exposed portion of the positive electrode current collector such that it is electrically connected to the exposed portion should dissolve at a voltage exceeding an overcharge voltage of batteries, typically 4.2 V. When the overcharge voltage is applied, the metal provided on the positive electrode current collector dissolves into the non-aqueous electrolyte and deposits on the negative electrode current collector which is disposed opposite to the metal. Due to the metal that successively deposits on the negative electrode current collector, the positive electrode current collector and the negative electrode current collector are shorted. This prevents the overcharge from proceeding further. Any metals can be used as long as they dissolve at a voltage exceeding an overcharge voltage.

As described above, the metal used in the present invention preferably dissolves at an overcharge voltage exceeding 4.2 V but as close to 4.2 V as possible, and prevents the battery voltage from reaching a level at which the positive electrode active material becomes more unstable. Further, in order to prevent overcharge from proceeding, the metal should dissolve rapidly at a voltage exceeding 4.2 V, allowing the ratio of the overcharge current used for the dissolving reaction of the metal to be higher than that of the overcharge current used for the charge reaction of the battery. Furthermore, in order to effect high rate discharge, the metal should have a low electrical resistance when the metal deposits on the negative electrode current collector and causes a short-circuit.

The present inventors vigorously investigated such metal suitably used for the present invention, and they found iron alloy, copper alloy or cobalt alloy which contains chromium in an amount of 0.1 to 30 wt % is preferred.

As described previously, iron dissolves significantly at a potential of not less than 3.4 V, copper and cobalt at not less than 3.6 V relative to a lithium electrode. If any of the metals is used singly in the positive electrode, it causes a short-circuit even at a normal operation voltage of 3.2 V or less, reducing the battery capacity. Accordingly, they cannot be used singly in the present invention. On the other hand, chromium hardly dissolves until 6.0 V, and therefore the use of chromium alone cannot prevent overcharge from proceeding because it cannot cause a short-circuit between the positive and negative electrodes at a voltage exceeding 4.2 V. For this reason, chromium cannot be used singly in the present invention.

However, it has been found that an alloy prepared by adding at least 1 wt % of chromium to iron, copper or cobalt dissolves when the battery voltage exceeds 4.2 V. It has been shown to have a high dissolving reaction speed and a low electrical resistance when it deposits and causes a short-circuit. Therefore, the alloy is a suitable metal for the present invention. An alloy prepared by adding more than 30 wt % of chromium to iron, copper or cobalt is also applicable to the present invention because it dissolves when the battery voltage exceeds 4.2 V, but its dissolving reaction speed is slow so that it is not preferred.

The foregoing indicates that the addition of a small amount of chromium increases the dissolving potential of iron, copper or cobalt, and that the addition of a large amount of chromium inhibits the dissolving reaction.

Accordingly, in the non-aqueous electrolyte secondary battery of the present invention, the metal provided on the surface of the exposed portion of the positive electrode current collector such that the metal is electrically connected to the exposed portion is preferably iron alloy, copper alloy or cobalt alloy that contains chromium in an amount of 0.1 wt % to 30 wt %.

The non-aqueous electrolyte secondary battery of the present invention can have any known battery shape such as cylindrical, prismatic or in the form of a sheet. In any case, regardless of the battery shape, the battery is produced as follows. An electrode group in which a positive electrode and a negative electrode are spirally wound with a separator interposed therebetween is housed into a battery case. A positive electrode current collector is connected to a positive electrode terminal provided outside the battery case with a lead. A negative electrode current collector is connected to a negative electrode terminal with a lead. A non-aqueous electrolyte is then injected into the battery case. Finally, the battery case is sealed.

The positive electrode comprises a current collector made of a metal foil (e.g., aluminum foil) and positive electrode material mixture layers carried on the surfaces of the current collector. The positive electrode material mixture layers are formed as follows. A positive electrode material mixture paste is first prepared by mixing a positive electrode active material capable of absorbing and desorbing lithium ions, a conductive material and a binder with a solvent of the binder or a dispersing medium. The positive electrode material mixture paste is then applied onto the surfaces of the current collector, followed by drying and rolling.

In the positive electrode, in order to form an exposed portion of the current collector where no positive electrode material mixture layer is formed, in the step of applying the positive electrode material mixture paste onto the surface of the current collector, a portion of the surface of the current collector should be left unapplied. Alternatively, after applying the positive electrode material mixture paste onto the entire surface of the current collector, the formed material mixture layer is partially removed from the current collector.

The positive electrode active material can be any known positive electrode active material such as a lithium transition metal composite oxide or a transition metal polyanion compound. Examples of the lithium transition metal composite oxide include lithium cobalt oxide ($LiCoO_2$), modified forms of lithium cobalt oxide, lithium nickel oxide ($LiNiO_2$), modified forms of lithium nickel oxide, lithium manganese oxide ($LiMn_2O_4$), modified forms of lithium manganese oxide, and a composite oxide obtained by partially replacing Co, Ni or Mn of the above-listed oxide with other transition metal element, a typical metal (e.g., aluminum) or an alkaline-earth metal (e.g., magnesium). The transition metal polyanion compound is a phosphate or sulfate, having a NASICON structure or olivine structure, of a transition metal such as manganese, iron, cobalt or nickel. When the lithium transition metal composite oxide or the transition metal polyanion compound is used as the positive electrode active material, they may be used singly or in combination of two or more.

The conductive material serves to ensure the electrical conductivity of the positive electrode material mixture layer. As the conductive material, a carbon material such as carbon black, acetylene black, ketjen black or graphite can be used. They may be used singly or in any combination of two or more.

The binder serves to bind the active material and the conductive material and to help them adhere to the current collector surface. Examples of the binder include polytetrafluoroethylene (PTFE), modified forms of PTFE, polyvinylidene fluoride (PVDF), modified forms of PVDF, fluorine-containing resins such as fluorine-containing rubber, thermoplastic resins such as polypropylene and polyethylene, and modified acrylonitrile rubber particles (e.g., BM-500B (trade name) available from Zeon Corporation, Japan). PTFE and BM-500B are preferably used with a thickener such as carboxymethyl cellulose (CMC), polyethylene oxide, or modified acrylonitrile rubber (BM-720H (trade name) available from Zeon Corporation, Japan).

As the medium for dispersing the active material and the conductive material and for dispersing or dissolving the binder, an organic solvent (e.g., N-methyl-2-pyrrolidone) or water can be used. In order to improve the stability with time and the dispersability of the positive electrode material mixture paste, it is also effective to add an additive such as a surfactant.

As the current collector, a metal foil made of a metal which is stable at a positive electrode potential such as aluminum, or a resin film having a surface layer made of a metal which is stable at a positive electrode potential such as aluminum can be used. In order to improve the current collecting efficiency of the current collector, the surface of the current collector may be roughened or perforated. The previously-described metal that dissolves at a voltage exceeding 4.2 V may have any shape as long as the metal is provided such that the metal is electrically connected to the exposed portion of the positive electrode current collector where no positive electrode material mixture layer is formed. For example, a metal foil is merely attached to the surface of the exposed portion of the positive electrode current collector. The metal foil is fixed in a particular position when the electrode group is spirally wound. More preferably, the metal foil and the current collector are securely joined together by welding. Alternatively, a metal powder may be attached onto the surface of the exposed portion of the positive electrode current collector using the binder described above. In this case, the positive electrode current collector is preferably pressed to reduce the contact resistance between the metal powder and the current collector. As for the amount of the metal, several tens of μm would be sufficient if the metal deposits on the negative electrode, penetrates through the separator and contacts the positive electrode. However, as the amount of the metal is increased, the number of shorted area increases, which means higher rate discharge can be achieved. For this reason, the amount of the metal is preferably as large as possible as far as the battery design allows.

The negative electrode comprises a current collector made of a metal foil (e.g., copper foil) and negative electrode material mixture layers carried on the surfaces of the current collector. The negative electrode material mixture layers are formed as follows. A negative electrode material mixture paste is first prepared by mixing a negative electrode active material capable of absorbing and desorbing lithium ions and a binder with a solvent of the binder or a dispersing medium. The negative electrode material mixture paste is then applied onto the surfaces of the current collector, followed by drying and rolling.

In the negative electrode, in order to form an exposed portion of the current collector where no negative electrode material mixture layer is formed, in the step of applying the negative electrode material mixture paste onto the surface of the current collector, a portion of the surface of the current collector should be left unapplied. Alternatively, after applying the negative electrode material mixture paste onto the entire surface of the current collector, the formed material mixture layer is partially removed from the current collector.

As the negative electrode active material, any known negative electrode active material can be used. Examples include: carbon materials such as various natural graphites, various artificial graphites, petroleum coke, carbon fiber, baked organic polymer, carbon nanotube and carbon nanohorn; oxides, silicon such as silicide, tin-containing composite materials, various metals and alloy materials.

The binder is not specifically limited. Preferred is a rubber particle because a small amount thereof can provide satisfactory binding capability. Particularly preferred is a rubber particle containing a styrene unit and a butadiene unit. Examples include styrene-butadiene copolymer (SBR) and modified forms of SBR. When the rubber particle is used as the negative electrode binder, a thickener composed of a water-soluble polymer is preferably used together. The water-soluble polymer is preferably a cellulose derivative, particularly carboxymethyl cellulose. As the negative electrode binder, other than the rubber particle, PVDF or a modified form of PVDF may be used.

As the current collector, a metal foil made of a metal which is stable at a positive electrode potential such as aluminum, or a resin film having a surface layer made of a metal which is stable at a positive electrode potential such as aluminum can be used. In order to improve the current collecting efficiency of the current collector, the surface of the current collector may be roughened or perforated.

The separator is not specifically limited as long as it is a microporous film or non-woven fabric made of a material capable of withstanding battery operating conditions which allows ions contained in the electrolyte to pass therethrough and insulates the positive and negative electrodes from each other. Ordinarily, a microporous film made of a polyolefin resin is used. As the polyolefin resin, polyethylene, polypropylene or the like is used. The microporous film may be a monolayer film made of one type of resin, a multilayer film made of at least two types of resin, or a multilayer film made of a resin and an inorganic material (e.g., alumina).

The battery case for accommodating the above-described power generating elements is not specifically limited. The battery case can be made of any known material and have any known shape. Examples of the material include aluminum alloy, iron alloy plated with nickel, and a laminate of a resin and a metal. The battery shape varies according to the type of battery to be produced such as a bottomed can having a cylindrical or prismatic shape, or a bag-like shape.

The non-aqueous electrolyte is prepared by dissolving an electrolyte in an organic solvent. The organic solvent is not specifically limited as long as it is an organic solvent ordinarily used for non-aqueous electrolyte secondary batteries. Examples include carbonates, halogenated hydrocarbon, ethers, ketones, nitriles, lactones and oxolane compounds. Particularly preferred is a solvent mixture composed of a solvent of high dielectric constant (e.g., ethylene carbonate or propylene carbonate) and a solvent of low viscosity (e.g., dimethyl carbonate, diethyl carbonate or ethyl methyl carbonate). The solvent may further contain, as a second solvent, dimethoxyethane, tetrahydrofuran or $\gamma$-butyrolactone. Additives can also be used to improve battery performance such as storage characteristics, cycle characteristics and safety. Preferred examples of the additives that can be added to the non-aqueous electrolyte include vinylene carbonate, cyclohexylbenzene and their derivatives.

As the electrolyte, an inorganic salt selected from $LiPF_6$, $LiBF_4$, $LiClO_4$ and $LiAsF_6$, a derivative of the inorganic salt, an organic salt selected from $LiSO_3CF_3$, $LiC(SO_3CF_3)_2$, $LiN(SO_3CF_3)_2$, $LiN(SO_2C_2F_5)_2$ and $LiN(SO_2CF_3)(SO_2C_4F_9)$, or a derivative of the organic salt can be used. Among them, particularly preferred are $LiPF_6$ and $LiBF_4$. This is because, as discussed previously, a conductive polymer doped with anions produced from $LiPF_6$ or $LiBF_4$ has increased conductivity, and therefore efficient short-circuit discharge can be performed in the event of an overcharge. The concentration of the electrolyte is usually, but not specifically limited to, 0.5 to 2.0 mol/L.

The present invention will be described below in further detail with reference to EXAMPLEs.

EXAMPLES 1 TO 24

The metal to be provided to the exposed portion of positive electrode current collector was produced as follows. Firstly, metal components were weighed to have a predetermined weight. A mixture of the metal components was melted in an argon atmosphere. The resulting molten metal was injected to the surface of a rotating metal roller having been cooled (so-called roll quenching method) to produce a foil having a thickness of 20 to 30 $\mu$m. In EXAMPLEs 1 to 24, twenty-four different alloy foils having compositions shown in Table 1 were produced. Note that the alloys listed in Table 1 are expressed in metallurgical terms. More specifically, for example, Fe-10Cr means an iron-chromium alloy containing 10 wt % of chromium.

In the EXAMPLEs 1 to 24, to produce lithium ion secondary batteries, lithium cobalt oxide represented by $LiCoO_2$ was used as the positive electrode active material, and graphite was used as the negative electrode active material.

a) Production of Positive Electrode

A positive electrode material mixture paste was prepared by mixing with stirring 3 kg of lithium cobalt oxide, 1 kg of #1320 (trade name) available from Kureha Chemical Industry Co., Ltd. (an NMP solution containing 12 wt % PVDF) as the binder, 90 g of acetylene black as the conductive material, and an appropriate amount of NMP with the use of a double arm kneader. This positive electrode material mixture paste was applied onto both surfaces of a 15 $\mu$m thick aluminum foil (positive electrode current collector) except for two portions: a portion to which a positive electrode lead would be attached (hereinafter referred to as positive electrode lead connecting portion); and a portion which would serve as the exposed portion where the metal that dissolves at a voltage exceeding 4.2 V would be attached, followed by drying and rolling. Thereby, positive electrode material mixture layers, each having a density (the weight of the material mixture layer/the volume of the material mixture layer) of 3.3 g/cm$^3$, were formed. An electrode plate composed of the aluminum foil and the positive electrode material mixture layers had a thickness of 160 $\mu$m. Thereafter, the electrode plate was cut to have a width that allows it to be inserted into a battery case for 18650 type cylindrical batteries, namely 5.5 cm. Thereby, a positive electrode hoop was obtained.

b) Production of Negative Electrode

A negative electrode material mixture paste was prepared by mixing with stirring 3 kg of artificial graphite, 75 g of BM-400B (trade name) available from Zeon Corporation, Japan (an aqueous dispersion containing 40 wt % modified form of styrene-butadiene copolymer), 30 g of CMC as a thickener, and an appropriate amount of water with the use of a double arm kneader. This negative electrode material mixture paste was applied onto both surfaces of a 10 µm thick copper foil (negative electrode current collector) except for two portions: a portion where a negative electrode lead would be attached (hereinafter referred to as negative electrode lead connecting portion); and a portion where a conductive polymer film would be attached, followed by drying and rolling. Thereby, negative electrode material mixture layers, each having a density (the weight of the material mixture layer/the volume of the material mixture layer) of 1.4 g/cm$^3$, were formed. An electrode plate composed of the copper foil and the negative electrode material mixture layers had a thickness of 180 µm. Thereafter, the electrode plate was cut to have a width that allows it to be inserted into a battery case for 18650 type cylindrical batteries, namely 5.7 cm. Thereby, a negative electrode hoop was obtained.

c) Preparation of Non-Aqueous Electrolyte

A non-aqueous electrolyte was prepared by dissolving LiPF$_6$ (electrolyte) at a concentration of 1 mol/l in a non-aqueous solvent composed of ethylene carbonate, dimethyl carbonate and ethyl methyl carbonate at a volume ratio of 2:3:3. Vinylene carbonate was further added to the non-aqueous electrolyte in an amount of 3 parts by weight per 100 parts by weight of the non-aqueous electrolyte.

d) Production of Battery

Using the positive and negative electrodes and non-aqueous electrolyte produced above, a 18650 type cylindrical battery was produced in the following procedure.

Firstly, the positive electrode and the negative electrode were cut to have a certain length. An end of a positive electrode lead was connected to the positive electrode lead connecting portion. Similarly, an end of a negative electrode lead was connected to the negative electrode lead connecting portion. A metal foil (size: 5.5 cm×0.5 cm) that dissolves at a voltage exceeding 4.2 V was attached to the exposed portion of the positive electrode current collector with a space of about 5 mm interposed between the metal foil and the positive electrode material mixture layer by spot-welding.

Subsequently, the positive electrode and the negative electrode were combined with a 15 µm thick microporous polyethylene separator interposed therebetween such that the portion of the positive electrode to which the metal foil was attached faced the exposed portion of the negative electrode current collector. The whole was spirally wound, and thus a cylindrical electrode group was formed. The outer surface of the electrode group was wrapped by the separator. On the top and bottom of the obtained electrode group were placed insulating rings, respectively. The electrode group was then housed in a battery case, after which 5 g of the non-aqueous electrolyte was injected into the battery case. The pressure within the battery case was reduced to 133 Pa so as to impregnate the electrode group with the non-aqueous electrolyte.

The other end of the positive electrode lead was welded to the underside of a battery lid. Similarly, the other end of the negative electrode lead was welded to the inner bottom surface of the battery case. Finally, the opening of the battery case was sealed with the battery lid equipped with an insulating packing therearound. Thereby, a cylindrical lithium ion secondary battery having a designed capacity of 2 Ah was produced. Subsequently, the produced battery was cycled twice. In each charge/discharge cycle, the battery was charged at a constant current of 400 mA until the battery voltage reached 4.2 V, and then discharged at a constant current of 400 mA until the battery voltage decreased to 3.0 V. Thereby, the production of the battery was completed.

COMPARATIVE EXAMPLE 1

A battery of COMPARATIVE EXAMPLE 1 was produced in the same manner as described in EXAMPLEs 1 to 24 except that the metal that dissolves at a voltage exceeding 4.2 V was not attached.

COMPARATIVE EXAMPLES 2 TO 4

Batteries of COMPARATIVE EXAMPLEs 2, 3 and 4 were produced in the same manner as described in EXAMPLEs 1 to 24 except that each of the alloys of EXAMPLEs 4 (Fe-10Cr), 12 (Cu-10Cr) and 20 (Co-10Cr) was attached to the surface of the positive electrode material mixture layer. In other words, those batteries were produced such that, in the event of an overcharge, the metal that dissolves at a voltage exceeding 4.2 V causes a short-circuit in an area where the positive and negative electrode material mixture layers exist together.

COMPARATIVE EXAMPLE 5

A battery of COMPARATIVE EXAMPLE 5 was produced in the same manner as described in EXAMPLEs 1 to 24 except for the following.

A positive electrode was produced according to the method disclosed in Patent Document 3. Specifically, a positive electrode material mixture paste was prepared by adding, to lithium cobalt oxide, a stainless steel SUS 316 (i.e., Fe-18 Cr-12 Ni-2.5 Mo alloy) powder having a particle size of 15 µm in an amount equivalent to 1 wt % of the lithium cobalt oxide. In the production of the positive and negative electrodes, the positive electrode material mixture and the negative electrode material mixture were applied to the positive electrode current collector and the negative electrode current collector, respectively, except for the lead connecting portions. The metal that dissolves at a voltage exceeding 4.2 V was not used here.

COMPARATIVE EXAMPLE 6

A battery of COMPARATIVE EXAMPLE 6 was produced in the same manner as described in EXAMPLEs 1 to 24 except that a chromium foil having a thickness of 50 µm was attached to the exposed portion of the positive electrode current collector.

COMPARATIVE EXAMPLES 7 TO 9

Batteries of COMPARATIVE EXAMPLEs 7, 8 and 9 were produced in the same manner as described in EXAMPLEs 1 to 24 except that a 30 µm thick iron foil (COMPARATIVE EXAMPLE 7), a 30 µm thick copper foil (COMPARATIVE EXAMPLE 8) or a 30 µm thick cobalt foil (COMPARATIVE EXAMPLE 9) was attached to the exposed portion of the positive electrode current collector.

Overcharge Test

Each of the lithium ion secondary batteries of EXAMPLEs 1 to 24 and COMPARATIVE EXAMPLEs 1 to 9 was charged at 0.5 hour rate based on the designed capacity (i.e., at a constant current of 4 A) for 2 hours at an ambient temperature of 20° C., during which the terminal voltage and surface temperature of the battery were measured. The surface temperature was measured by a thermocouple.

Battery Evaluation

In the batteries of COMPARATIVE EXAMPLEs 7, 8 and 9, a short-circuit occurred when charged at a constant current of 400 mA immediately after the production of the batteries, and they lost their function as batteries. Presumably, this is because those batteries contained metals (namely, iron, copper and cobalt, respectively) having a dissolving potential lower than 4.2 V relative to that of negative electrodes, and the metals dissolved and deposited, and caused the short-circuit.

Figure 3:
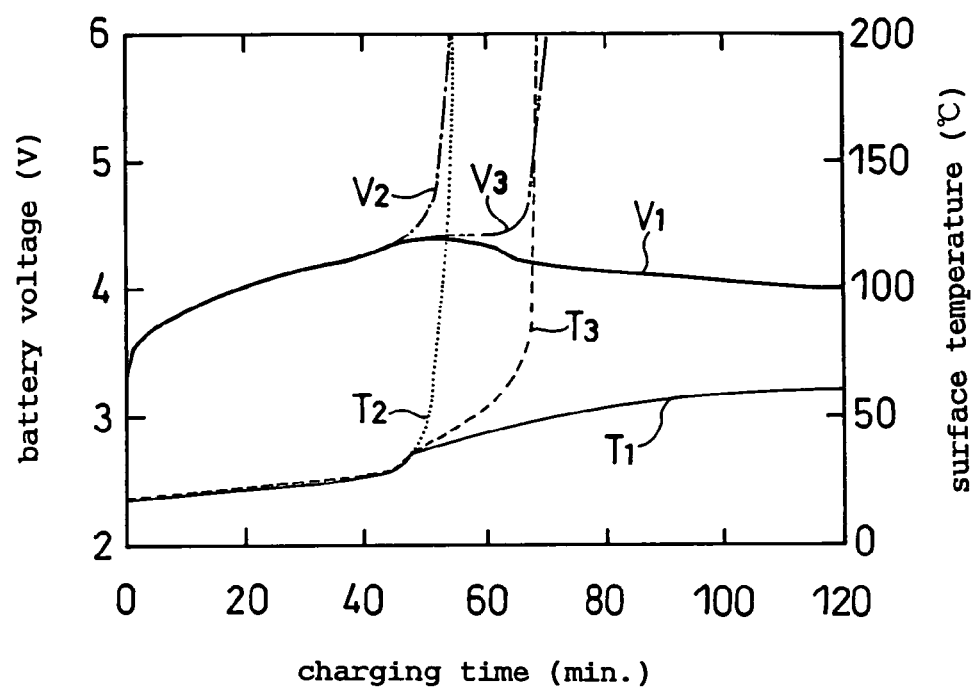
FIG. 3 is a graph of battery voltage versus charging time, or of surface temperature versus charging time for batteries of EXAMPLEs and COMPARATIVE EXAMPLEs of the present invention.

FIG. 3 shows representative results of the overcharge test for the batteries except for those of COMPARATIVE EXAMPLEs 7 to 9. FIG. 3 is a graph with charging time from the beginning of the constant current charge at 4 A on the horizontal axis, battery voltage on the left vertical axis, and surface temperature of the battery on the right vertical axis. In the graph, V1 is a voltage curve typical of the batteries of EXAMPLEs 1 to 24. V2 is a voltage curve typical of the batteries of COMPARATIVE EXAMPLEs 1 and 6. V3 is a voltage curve typical of the batteries of COMPARATIVE EXAMPLEs 2 to 5. T1 is a temperature curve typical of the batteries of EXAMPLEs 1 to 24. T2 is a temperature curve typical of the batteries of COMPARATIVE EXAMPLEs 1 and 6. T3 is a temperature curve typical of the batteries of COMPARATIVE EXAMPLEs 2 to 5.

In all the batteries including those of EXAMPLEs 1 to 24 and those of COMPARATIVE EXAMPLEs 1 to 6, the voltage and the surface temperature increased due to the charge. More specifically, in the batteries of COMPARATIVE EXAMPLEs 1 and 6, the battery voltage sharply increased 45 minutes after the beginning of the charge. This is because as the overcharge proceeded, most of the lithium contained in the positive electrode active material was deintercalated, and the internal resistance of the batteries increased. With this increase, a large amount of heat was produced, which sharply increased the battery temperature, resulting in thermal runaway. The chromium contained in the battery of COMPARATIVE EXAMPLE 6 did not dissolve almost at all in the overcharge test, and thus it did not serve to ensure safety of the battery.

As for the batteries of COMPARATIVE EXAMPLEs 2 to 5, the voltage curve once became flat about 50 minutes after the beginning of the charge. It can be assumed from this that the metal having dissolved from the positive electrode and deposited on the negative electrode caused a short-circuit at that point. Meanwhile, the surface temperature of the battery continuously increased, and the battery finally went into thermal runaway about 70 minutes after the beginning of the charge. Presumably, with the occurrence of thermal runaway, the internal resistance of the batteries increased and thus the battery voltage increased sharply.

In contrast, in the batteries of EXAMPLEs 1 to 24, the battery voltage started to decrease about 50 minutes after the beginning of the charge and continued to decrease slowly. This suggests that the batteries discharged at a rate higher than the charge current of 4 A due to internal short-circuit. The surface temperature of the battery continued to increase gradually, but the battery did not go into thermal runaway throughout the test.

The difference in behavior between the batteries of EXAMPLEs 1 to 24 and those of COMPARATIVE EXAMPLEs 2 to 5 can be explained as follows.

The batteries of EXAMPLEs 1 to 24 and those of COMPARATIVE EXAMPLEs 2 to 5 are the same in that the metal provided on or contained in the positive electrode dissolved and deposited on the negative electrode, and the deposited metal penetrated the separator, which caused a short-circuit. However, they are different in that the metal provided on or contained in the positive electrode of the batteries of COMPARATIVE EXAMPLEs 2 to 5 existed on the surface of or inside the positive electrode material mixture layer so that the short-circuit occurred between the positive electrode material mixture layer and the negative electrode material mixture layer. It is generally known that the electrical resistance of a positive electrode active material mixture layer is larger than that of a negative electrode material mixture layer or a current collector. For this reason, the electrical resistance of a path where a short-circuit current flows is high. This prevents high rate discharge and increases the Joule heat. Accordingly, when the overcharge current is large, it is difficult to prevent overcharge from proceeding. Moreover, large Joule heat in the material mixture layer having a larger electrical resistance causes decomposition of the positive electrode. The dissociated oxygen oxidizes the nearby negative electrode active material and electrolyte, which causes a thermal runaway.

In the batteries of EXAMPLEs 1 to 24, on the other hand, the metal was provided on the portion where neither the positive or negative electrode material mixture layer existed (i.e., on the surface of the positive electrode current collector facing the negative electrode current collector), and therefore the short-circuit current flowed from the positive electrode current collector through the deposited metal to the negative electrode current collector. The electrical resistance of this path was small. For this reason, high rate short circuit discharge was achieved. Moreover, even when the charge current is large, it is possible to prevent overcharge from proceeding. It is also possible to discharge so as to reduce the depth of charge, whereby the battery can be made thermally stable. Further, the short-circuit current in the batteries of EXAMPLEs 1 to 24 was larger than that in the batteries of COMPARATIVE EXAMPLEs 2 to 5, but because the electrical resistance of the path where the short-circuit current flowed was small, the amount of the Joule heat was as small as that of the batteries of COMPARATIVE EXAMPLEs 2 to 5 or smaller. Furthermore, the positive electrode material mixture layer did not exist in the path where the short-circuit current flowed. Accordingly, the positive electrode active material did not decompose and oxygen which would oxidize the negative electrode active material and the electrolyte was not dissociated so that thermal runaway was prevented. In short, the cause of thermal runaway can be eliminated. The foregoing illustrates that the present invention can provide a non-aqueous electrolyte secondary battery having excellent safety.

Although FIG. 3 showed a graph indicating the representative results of the overcharge test, in order to clearly show the significance of the results of the batteries of EXAMPLEs 1 to 24, the numerical results are shown in Table 1 in which the type of metal that dissolves at a voltage exceeding 4.2 V and the short-circuit voltage and the maximum battery temperature obtained in the overcharge test are shown.

TABLE 1

| | Metal that dissolves at a voltage exceeding 4.2 V | Short-circuit voltage/V | Maximum temperature/° C. |
|---|---|---|---|
| Example 1 | Metal 1: Fe—0.1Cr | 4.22 | 60.1 |
| Example 2 | Metal 2: Fe—0.5Cr | 4.24 | 61.4 |
| Example 3 | Metal 3: Fe—1Cr | 4.28 | 63.2 |
| Example 4 | Metal 4: Fe—10Cr | 4.35 | 70.7 |
| Example 5 | Metal 5: Fe—20Cr | 4.54 | 75.3 |
| Example 6 | Metal 6: Fe—30Cr | 4.79 | 82.3 |
| Example 7 | Metal 7: Fe—35Cr | 5.03 | 95.1 |
| Example 8 | Metal 8: Fe—45Cr | 5.57 | 98.8 |
| Example 9 | Metal 1: Fe—0.1Cr | 4.23 | 61.3 |
| Example 10 | Metal 2: Fe—0.5Cr | 4.25 | 62.7 |
| Example 11 | Metal 3: Fe—1Cr | 4.28 | 63.7 |
| Example 12 | Metal 4: Fe—10Cr | 4.58 | 71.5 |
| Example 13 | Metal 5: Fe—20Cr | 4.46 | 77.2 |
| Example 14 | Metal 6: Fe—30Cr | 4.82 | 83.0 |
| Example 15 | Metal 7: Fe—35Cr | 5.00 | 96.2 |
| Example 16 | Metal 8: Fe—45Cr | 5.61 | 97.5 |
| Example 17 | Metal 1: Fe—0.1Cr | 4.22 | 60.8 |
| Example 18 | Metal 2: Fe—0.5Cr | 4.25 | 61.8 |
| Example 19 | Metal 3: Fe—1Cr | 4.30 | 63.9 |
| Example 20 | Metal 4: Fe—10Cr | 4.57 | 72.0 |
| Example 21 | Metal 5: Fe—20Cr | 4.48 | 76.9 |
| Example 22 | Metal 6: Fe—30Cr | 4.83 | 82.7 |
| Example 23 | Metal 7: Fe—35Cr | 5.10 | 95.5 |
| Example 24 | Metal 8: Fe—45Cr | 5.66 | 99.3 |

As can be seen from Table 1, all the batteries of EXAMPLEs 1 to 24 did not go into thermal runaway and exhibited extremely excellent safety. The short-circuit occurred in the range from 4.22 V to 5.66 V. As for the maximum temperature, the highest was 99.3° C. The short-circuit voltage and the maximum temperature increased as the amount of chromium contained in the alloys was increased. A comparison among iron-chromium alloys, copper-chromium alloys and cobalt-chromium alloys does not indicate any significant differences in terms of both short-circuit voltage and maximum temperature. Regardless of the type of alloy, when the amount of chromium was not less than 0.1 wt %, the short-circuit voltage exceeded 4.2 V. When the amount of chromium exceeded 30 wt %, although the batteries did not go into thermal runaway, the short-circuit voltage exceeded 5 V and the maximum temperature exceeded 90° C. It can thus be concluded that the iron alloy, the copper alloy and the cobalt alloy preferably contain chromium in an amount of 0.1 wt % to 30 wt %.

As described above, the short-circuit voltage varies according to the metal material used. Accordingly, even if the charge voltage of lithium ion secondary batteries is increased to a level higher than the current level of 4.2 V in the future, by selecting a material that can provide an appropriate short-circuit voltage from the materials listed in EXAMPLEs 1 to 24, it is evident that the same effect as obtained in EXAMPLEs 1 to 24 can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising: an electrode group in which a positive electrode plate and a negative electrode plate are spirally wound with a separator interposed therebetween; and a non-aqueous electrolyte, said positive electrode plate comprising a positive electrode current collector and a positive electrode material mixture layer carried on said positive electrode current collector, said negative electrode plate comprising a negative electrode current collector and a negative electrode material mixture layer carried on said negative electrode current collector, wherein said positive electrode plate has at least one exposed portion of said positive electrode current collector, wherein said negative electrode plate has at least one exposed portion of said negative electrode current collector, and wherein a metal is provided on a surface of said exposed portion of the positive electrode current collector facing said exposed portion of the negative electrode current collector, wherein said metal dissolves into said non-aqueous electrolyte when the battery voltage exceeds a predetermined level.

2. The non-aqueous electrolyte secondary battery in accordance with claim 1, wherein said predetermined level is 4.2V.

3. The non-aqueous electrolyte secondary battery in accordance with claim 1, wherein said metal comprises at least one alloy selected from the group consisting of iron alloy, copper alloy and cobalt alloy, and said at least one alloy contains chromium in an amount of 0.1 to 30 wt %.

* * * * *